3,340,156
PURIFICATION OF PLASMINOGEN
Villy Johannes Jensen, Vanlose, Denmark, assignor to Novo Terapeutisk Laboratorium A/S, Copenhagen, Denmark, a Danish joint-stock company
No Drawing. Filed Apr. 19, 1965, Ser. No. 449,328
Claims priority, application Great Britain, Apr. 28, 1964, 17,649/64
8 Claims. (Cl. 195—66)

ABSTRACT OF THE DISCLOSURE

The invention provides a process for the purification of human or animal plasminogen by employing an aliphatic amino acid for distributing the plasminogen and the accompanying impurities, respectively, between an anion exchanger phase and a phase of a water-miscible polymer, whereby a considerably purified plasminogen is obtained.

---

The present invention relates to a process for the purification of impure plasminogen.

It is know that human plasminogen may be purified by a modification of the Kline method followed either by gel filtration through dextran columns or by chromatography on DEAE-dextran columns (diethylaminoethyl dextran).

Furthermore, human plasminogen has also been purified by means of diethylaminoethyl cellulose ion exchangers employing lysine for displacing the plasminogen from the columns prior to displacement of undesired impurities in the form of other proteins.

Thus, DEAE-cellulose may be suspended in an ammonium acetate buffer solution of pH about 9 and containing lysine to a concentration of 0.01 M, whereafter human plasminogen which has already been purified partially is dissolved in the above buffer and applied to a column containing the above suspension. When the column is developed with ammonium acetate buffer containing lysine there is obtained a fraction containing the main part of the caseinolytic and fibrinolytic activity, but only a small part of the other proteins.

It has further been established that dextran is able to form two-phase systems with other polymers. As an example, when 5 g. of dextran G 25 and 5 g. of polyethylene glycol having a molecular weight of 6000 are added to 100 ml. of water and the resulting system is stirred or otherwise agitated, the system will separate into two phases after centrifugalization or following standing for some time. The upper phase mainly consists of polyethylene glycol while the main part of the lower phase is the dextran G 25. It has also been established that many proteins are dissolved in the dextran-polyethylene glycol system, and that the distribution of proteins between the two phases depends upon the molecular weight fraction of the polymers and also to a considerable degree upon the salt content. Thus, a protein may be transferred from one phase to another merely by changing the ionic composition of the phase system.

In accordance with the present invention it has now been found that impure plasminogen of human or animal origin can be purified to a considerable extent by employing an aliphatic amino acid for distributing the plasminogen and the accompanying impurities, respectively, between two phases one of which is an anion exchanger and the other is a water miscible high molecular compound, whereafter the latter phase is isolated.

It has been found that when impure plasminogen is treated in the above manner the aliphatic amino acid acts to concentrate the plasminogen in the phase comprising the water-miscible high molecular compound while the main part of the impurities is concentrated in the anion exchanger phase. The amino acid employed should, of course, be compatible with the plasminogen, i.e. it should be selected among those aliphatic amino acids which do not deactivate or denature the plasminogen.

The two-phase system formed by the water-miscible high molecular compound and the anion exchanger may be a liquid-liquid system or a liquid-solid system, depending upon the specific high molecular compound and anion exchanger employed. In case a two-phase liquid system is formed, the purified plasminogen will be concentrated in the upper phase which mainly consists of the water-miscible high molecular compound. As an example, in the system polyethylene glycol-dextran the plasminogen will be found in the upper polyethylene glycol phase. If, for example, an anion exchanger of the solid Amberlite type, such as IRA-400 is employed together with, say, polyethylene glycol, the plasminogen will also concentrate in the polyethylene glycol phase, the solid anion exchanger collecting as a solid bottom phase.

The fact that the plasminogen is concentrated in the upper phase is of considerable practical advantage because the said phase has a comparatively low viscosity and, therefore, is convenient to handle. In case the employed anion exchanger is of the dextran type, the lower phase is often very similar to a gel and is thus difficult to handle. When an amberlite anion exchanger resin is employed, the lower phase is a solid phase.

In contradistinction to purification on dextran columns which ordinarily are difficult to handle on a technical scale due to minute flow rates, it is advantageous to deal with a two-phase system which by batchwise operation can be separated into two phases. According to the invention also significantly greater yields can be obtained in comparison with the traditional methods of purification.

When human or animal plasminogen is purified in the manner described above the degree of purification obtained is sufficiently high for ordinary purposes to make further purification superfluous. Thus, the plasminogen which has been purified according to the method of the present invention may be used directly for activation to plasmin without the relatively large number of dissolution and precipitation procedures generally necessary in order to purify plasminogen which has been precipitated from blood serum.

As mentioned above the anion exchanger may be selected among various types among which there may be mentioned anion exchangers of the dextran type, e.g. the so-called DEAE-dextran, and anion exchanger resins of the well-known amberlite series, for example Amberlite IRA-400, and an anion exchanger of the cellulose type, for example DEAE-cellulose.

The water-miscible high molecular compound employed in the present process for forming the upper phase of the two-phase system may also be selected among a great variety of compounds, such as polyethylene glycol, polyvinyl pyrrolidone and methylcellulose. In connection with an anion exchanger phase consisting of DEAE-dextran it has been found to be especially appropriate to employ polyethylene glycol for forming the second phase. Experiments made seem to indicate that polyethylene glycol is also efficient in the case of amberlite anion exchanger resins.

As regards the aliphatic amino acids which may be amployed for the purpose of distributing the plasminogen between the two phases referred to in the foregoing, such amino acids as lysine, γ-amino butyric acid, ornithine, ε-amino caproic acid and arginine have been found to be particularly well suited, especially lysine. However, still further aliphatic amino acids may be used, e.g.

glycine, guanidino acetic acid, creatine, β-alanine, DL-valine, DL-leucine, DL-isoleucine, DL-norleucine, L(+)-aspartic acid, L(+)-citrulline, α-N-acetyl-L-arginine and glycyl glycine.

When carrying out the process of the present invention in practice it is preferred to employ an aliphatic amino acid of the type having a terminal amino group and a terminal carboxyl group in the main chain of the molecule, preferably with 5 to 6 carbon atoms in the main chain.

The relative amounts of the amino acid, the water-miscible high molecular compound and the anion exchanger may vary considerably depending upon the specific compounds selected in each instance. However, an experiment on a small laboratory scale will generally be sufficient to establish the appropriate relative amounts of the above components. As to the high molecular compound it should be noted, however, that in case a relatively low molecular weight is chosen, e.g. of polyethylene glycol, the compound will mostly have to be employed in relatively large concentrations.

It is preferred to employ the anion exchanger in amounts ranging from about 0.1 to about 10 percent of the plasminogen starting solution. If the anion exchanger is a resin it may be desirable to use this in a still higher concentration, e.g. up to about 30 percent. The reason therefor is that the resin does not swell so much as the other mentioned types of anion exchangers so that the resin will not bind so much of the aqueous phase as do the other mentioned types of anion exchangers. The amount of water-miscible high molecular compound is dependent upon the nature of the specific compound employed and especially upon the molecular weight thereof. The amino acid is preferably employed in an amount less than about 1 mole per litre of the plasminogen starting solution.

The plasminogen which is to be purified may be of human or animal origin. Preferably plasminogen isolated from pig's blood is employed. The plasminogen may thus be precipitated from serum or plasma from pig's blood by diluting 5 to 8 times with water at a pH-value of 5–6 as disclosed in U.S. patent application No. 327,339. Furthermore, the process of the invention may be employed in the purification of plasminogen which has been precipitated from serum or plasma from pig's blood by adding an organic solvent such as ethanol in an amount of at least 10 percent at a pH of 5–9 and at a temperature between the freezing point of the mixture and about 15° C. This process is disclosed in U.S. patent application No. 380,488.

In the following experiments lysine and thereafter diethylaminoethyl dextran and polyethylene glycol (molecular weight 6000) were added to 20 ml. portions of plasminogen solutions which were prepared from plasminogen precipitated from pig's serum at 0° C. and pH 6.0 by means of 20 percent ethanol. The pH was adjusted to a given value, and the solution was left for 10 minutes at room temperature and was then centrifuged at the same temperature. The upper phase was separated and the volume thereof was measured whereafter this phase was analyzed in the following manner:

The plasmin activity was determined after activating the plasminogen with urokinase, and the total plasmin activity was then calculated in percent of the plasmin activity of the original plasminogen solution. The percentage thus calculated is equal to the yield Y in the present process.

The protein concentration was determined as tyrosine + tryptophan at 280 mμ in 0.1 N NaOH by measuring the optical density ($OD_{280}$) of the experimental solution as compared with the optical densities of standard solutions containing varying known amounts of protein.

The specific plasmin activity was calculated as the number of plasmin units per $OD_{280}$, the experimental optical density being corrected by means of the blind value, i.e. the $OD_{280}$ of the system when containing no protein at all. The effectivity as regards the purification of plasminogen was calculated as the so-called enrichment factor E showing the number of times the specific activity was increased in the present process.

In the experiments the results of which are compiled in the following tables diethylaminoethyl dextran of the type DEAE-Sephadex A–50 Medium was employed as the anion exchanger phase. In the experimental series forming the basis of Table III the dextran was washed with distilled water and then freeze-dried before use. Hereby the smallest possible blind value for the $OD_{280}$ was obtained. The above dextran usually liberates compounds with ultraviolet absorption by slurrying in water. The water content of the freeze-dried dextran was 10.8 percent, whereas the normal dextran has a water content of 4.9 percent.

The polyethylene glycol employed in the experiments was a Shell product of the type PEG 6000 with a water content of 14.2 percent.

The experimental results set forth in Table I were obtained by employing a lysine concentration of 0.2 mole per litre, a diethylaminoethyl dextran concentration of 3.75 percent, and a polyethylene glycol concentration of 3.75 percent, the pH-value being varied between 2.0 and 10.0.

TABLE I

| Experimental series No. | Lysine moles per liter | DEAE-Dextran, mg. per 20 ml. | DEAE-Dextran, percent | PEG 6,000, mg. per 20 ml. | PEG 6,000, percent | pH | Volume of upper phase, ml. | Plasmin units per ml. | Plasmin units, total |
|---|---|---|---|---|---|---|---|---|---|
| 1 | | | | | | 2.0 | 15 | 0.500 | 7.500 |
| 2 | | | | | | | 14 | 0.520 | 7.280 |
| 3 | | | | | | | 14 | 0.342 | 4.788 |
| 1 | | | | | | 4.0 | 13 | 1.240 | 16.12 |
| 2 | | | | | | | 13 | 1.220 | 15.36 |
| 3 | | | | | | | 14 | 0.820 | 11.48 |
| 1 | 0.20 | 750 | 3.75 | 750 | 3.75 | 6.0 | 13 | 1.27 | 16.51 |
| 2 | | | | | | | 14 | 1.12 | 15.68 |
| 3 | | | | | | | 14 | 0.992 | 13.89 |
| 1 | | | | | | 8.0 | 14 | 1.32 | 18.48 |
| 2 | | | | | | | 14 | 1.21 | 16.94 |
| 3 | | | | | | | 14 | 1.13 | 15.85 |
| 1 | | | | | | 10.0 | 16 | 0.348 | 5.568 |
| 2 | | | | | | | 15 | 0.268 | 4.020 |
| 3 | | | | | | | 14 | 0.240 | 3.360 |

See footnotes at end of tables.

TABLE I—Continued

| Experimental series No. | Plasmin activity, percent of starting solution | Plasmin activity, average percent | $OD_{280}$ | Blind value of $OD_{280}$ | $OD_{280}$ corrected | Plasmin units per $OD_{280}$ | Enrichment factor E | |
|---|---|---|---|---|---|---|---|---|
| | | | | | | | Single determ. | Average |
| 1 | 31.3 | | 7.65 | | 7.230 | 0.0692 | 0.570 | |
| 2 | 31.4 | 38.9 | 7.00 | 0.420 | 6.580 | 0.0790 | 0.817 | 0.620 |
| 3 | 23.9 | | 7.65 | | 7.230 | 0.0473 | 0.473 | |
| 1 | 67.2 | | 6.45 | | 6.001 | 0.207 | 1.71 | |
| 2 | 68.4 | 64.3 | 5.93 | 0.449 | 5.481 | 0.223 | 2.31 | 1.82 |
| 3 | 57.4 | | 6.20 | | 5.751 | 0.143 | 1.43 | |
| 1 | 68.8 | | 3.38 | | 2.975 | 0.427 | 3.52 | |
| 2 | 67.6 | 68.6 | 3.72 | 0.405 | 3.315 | 0.338 | 3.50 | 3.45 |
| 3 | 69.5 | | 3.38 | | 2.975 | 0.333 | 3.33 | |
| 1 | 77.0 | | 3.63 | | 3.214 | 0.411 | 3.39 | |
| 2 | 73.0 | 76.4 | 3.63 | 0.416 | 3.214 | 0.376 | 3.89 | 3.60 |
| 3 | 79.3 | | 3.63 | | 3.214 | 0.352 | 3.52 | |
| 1 | 23.2 | | 4.13 | | 3.762 | 0.0925 | 0.763 | |
| 2 | 17.3 | 19.1 | 4.23 | 0.368 | 3.862 | 0.0694 | 0.718 | 0.706 |
| 3 | 16.8 | | 4.13 | | 3.762 | 0.0638 | 0.638 | |

Experimental series No. 1: 100% activity~24.0 plasmin units. Specific activity of starting product: 0.121 plasmin units per $OD_{280}$.
Experimental series No. 2: 100% activity~23.2 plasmin units. Specific activity of starting product: 0.0967 plasmin units per $OD_{280}$.
Experimental series No. 3: 100% activity~20.0 plasmin units. Specific activity of starting product: 0.100 plasmin units per $OD_{280}$.

It is seen from Table I that it is possible to obtain a considerable purification in the pH-range from 4 to 8. The highest purification and the highest yield was obtained at pH 8, but it appears from the table that practically the same results are obtained when employing a pH-value of 6.

The results set forth in Table II were obtained using the same concentrations of diethylaminoethyl dextran and polyethylene glycol as above. However, the pH-value was kept constant at 8.0, whereas the lysine concentration was varied from 0.05 to 0.25 mole per litre.

It appears from Table II below that the yield is increased when the lysine concentration is brought up from 0.05 to 0.25 mole per litre. However, the enrichment factor E shows its maximum value at a lysine concentration of about 0.1 mole per litre. At the latter lysine concentration the yield is about 34 percent, only.

In the experiments the results of which have been summarized in Table III a lysine concentration of 0.2 mole per litre and a pH-value of 8.0 were employed, whereas the concentrations of the diethylaminoethyl dextran and the polyethylene glycol were varied.

TABLE II

| pH | DEAE-Dextran, mg. per 20 ml. | DEAE-Dextran, percent | PEG 6,000, mg. per 20 ml. | PEG 6,000, percent | Lysine, moles per liter | Volume of upper phase in ml. | Plasmin units per ml. | Plasmin units, total | Plasmin activity, percent | $OD_{280}$ | Blind value of $OD_{280}$ | $OD_{280}$ corrected | Plasmin units per $OD_{280}$ corrected | Enrichment factor E |
|---|---|---|---|---|---|---|---|---|---|---|---|---|---|---|
| 8.0 | 750 | 3.75 | 750 | 3.75 | 0.05 | 11 | 0.132 | 1.452 | 7.12 | 1.05 | 0.540 | 0.510 | 0.259 | 2.77 |
| | | | | | 0.10 | 12 | 0.576 | 6.910 | 33.9 | 1.80 | 0.505 | 1.295 | 0.445 | 4.75 |
| | | | | | 0.15 | 13 | 0.932 | 12.10 | 59.3 | 3.030 | 0.517 | 2.513 | 0.371 | 3.96 |
| | | | | | 0.20 | 14 | 1.010 | 14.10 | 69.1 | 3.75 | 0.560 | 3.190 | 0.317 | 3.39 |
| | | | | | 0.25 | 14 | 1.060 | 14.80 | 72.5 | 5.180 | 0.590 | 4.590 | 0.231 | 2.47 |

100% activity~20.4 plasmin units. Specific activity of starting product: 0.0936 plasmin units per $OD_{280}$.

TABLE III

| DEAE-Dextran, mg. per 20 ml. | DEAE-Dextran, percent | PEG 6,000, mg. per 20 ml. | PEG 6,000, percent | Volume of upper phase in ml. | Plasmin units per ml. | | Total plasmin units | | Plasmin activity, percent | $OD_{280}$ | | Blind value of $OD_{280}$ | | $OD_{280}$ corrected | Plasmin units per $OD_{280}$ corr. | Enrichment factor E |
|---|---|---|---|---|---|---|---|---|---|---|---|---|---|---|---|---|
| | | | | | Single determ. | Average | Single determ. | Average | | Single determ. | Average | Single determ. | Average | | | |
| 250 | 1.25 | 250 | 1.25 | 17 / 16 | 1.180 / 1.180 | 1.180 | 20.1 / 18.9 | 19.5 | 94.9 | 7.950 / 9.000 | 8.475 | 0.168 / 0.186 | 0.177 | 8.298 | 0.142 | 1.46 |
| 625 | 3.13 | 250 | 1.25 | 12 / 12 | 1.500 / 1.390 | 1.445 | 18.0 / 16.7 | 17.4 | 84.7 | 8.500 / 8.700 | 8.600 | 0.230 / 0.210 | 0.220 | 8.380 | 0.172 | 1.77 |
| 1,000 | 5.00 | 250 | 1.25 | 8 / 9 | 1.590 / 1.450 | 1.520 | 12.7 / 13.1 | 12.9 | 62.8 | 7.875 / 7.500 | 7.688 | 0.246 / 0.250 | 0.248 | 7.440 | 0.204 | 2.10 |
| 250 | 1.25 | 625 | 3.13 | 16 / 17 | 1.190 / 1.070 | 1.130 | 19.0 / 18.2 | 18.6 | 90.6 | 6.180 / 6.075 | 6.128 | 0.230 / 0.232 | 0.231 | 5.897 | 0.192 | 1.98 |
| 625 | 3.13 | 625 | 3.13 | 14 / 14 | 1.210 / 1.150 | 1.180 | 16.9 / 16.1 | 16.5 | 80.3 | 4.470 / 3.900 | 4.185 | 0.240 / 0.264 | 0.252 | 3.933 | 0.300 | 3.09 |
| 1,000 | 5.00 | 625 | 3.13 | 11 / 11 | 1.210 / 1.250 | 1.230 | 13.3 / 13.8 | 13.6 | 66.2 | 3.300 / 2.820 | 3.060 | 0.286 / 0.292 | 0.289 | 2.771 | 0.444 | 4.58 |
| 1,375 | 6.88 | 625 | 3.13 | 9 / 9 | 1.200 / 1.280 | 1.240 | 10.8 / 11.5 | 11.2 | 54.5 | 2.100 / 2.500 | 2.300 | 0.350 / 0.370 | 0.360 | 1.940 | 0.639 | 6.59 |
| 250 | 1.25 | 1,000 | 5.00 | 18 / 18 | 0.780 / 0.948 | 0.864 | 14.0 / 17.1 | 15.6 | 75.9 | 2.880 / 2.775 | 2.828 | 0.246 / 0.276 | 0.261 | 2.567 | 0.337 | 3.47 |
| 625 | 3.13 | 1,000 | 5.00 | 15 / 15 | 0.880 / 0.836 | 0.858 | 13.2 / 12.5 | 12.9 | 62.8 | 2.040 / 2.295 | 2.168 | 0.284 / 0.300 | 0.292 | 1.876 | 0.457 | 4.71 |
| 1,000 | 5.00 | 1,000 | 5.00 | 12 / 13 | 0.712 / 0.752 | 0.732 | 8.54 / 9.78 | 9.16 | 44.6 | 1.200 / 1.325 | 1.263 | 0.360 / 0.330 | 0.345 | 0.918 | 0.797 | 8.22 |
| 1,375 | 6.88 | 1,000 | 5.00 | 9 / 10 | 0.732 / 0.668 | 0.700 | 6.59 / 6.68 | 6.64 | 32.3 | 1.130 / 1.110 | 1.120 | 0.380 / 0.388 | 0.384 | 0.736 | 0.951 | 9.80 |
| 625 | 3.13 | 1,375 | 6.88 | 16 / 16 | 0.448 / 0.440 | 0.444 | 7.17 / 7.04 | 7.11 | 34.6 | 1.110 / 1.175 | 1.143 | 0.326 / 0.350 | 0.338 | 0.805 | 0.552 | 5.69 |
| 1,000 | 5.00 | 1,375 | 6.88 | 13 / 13 | 0.300 / 0.372 | 0.336 | 3.90 / 4.84 | 4.37 | 21.3 | 0.775 / 0.800 | 0.788 | 0.400 / 0.380 | 0.390 | 0.398 | 0.844 | 8.70 |
| 1,375 | 6.88 | 1,375 | 6.88 | 9 / 10 | 0.280 / 0.268 | 0.274 | 2.52 / 2.68 | 2.60 | 12.6 | 0.720 / 0.684 | 0.702 | 0.396 / 0.444 | 0.420 | 0.282 | 0.971 | 10.00 |

100% activity~20.54 plasmin units. Specific activity of starting product: 0.0970 plasmin units per $OD_{280}$.

It appears from Table III that the plasminogen may be considerably purified when employing sufficiently high concentrations of diethylaminoethyl dextran and polyethylene glycol as well as lysine. Thus, when employing a lysine concentration of 0.2 mole per litre in connection with 5 percent concentrations of both the dextran compound and the polyethylene glycol, there is obtained an enrichment factor as high as 8.2 as well as a yield of about 45 percent. However, the total yield may be increased up to about 70 percent by shaking the diethylaminoethyl dextran phase once more with a fresh portion of polyethylene glycol, whereby additional 23 percent may be recovered. Thus, the present method of purifying plasminogen can be utilized to obtain a high enrichment factor and a high yield at the same time.

In the experiments the results of which are compiled in Table IV a pH-value of 8.0 and a lysine concentration of 0.2 mole per litre were employed. However, in these experiments polyvinyl pyrrolidone was used instead of polyethylene glycol. It appears from the table that a certain degree of purification is obtained in this manner.

The results appearing in Table V were obtained by employing methyl cellulose as the water-soluble high molecular component of the two-phase system. This table shows that enrichment factors of the same magnitude as above were obtained.

In Table VI there are shown results of experiments in which a two-phase system of DEAE-dextran and polyethylene glycol was employed in combination with amino acids other than lysine. It is seen from this table that the use of α-aminobutyric acid and of ε-amino caproic acid gives results corresponding to those obtained with lysine, whereas the use of ornithine gives a somewhat smaller enrichment factor. However, it is quite possible that a higher ornithine concentration will lead to a higher degree of purification.

TABLE IV pH=8.0; lysine concentration 0.2 moles per liter; t~25° C.

| DEAE-Dextran, mg. per 20 ml. | DEAE-Dextran, percent | Polyvinyl-pyrrol-idon, mg. per 20 ml. | Polyvinyl-pyrrol-idon, percent | Volume of upper phase, ml. | Plasmin units per ml. | Plasmin units, total | Plasmin activity, percent | $OD_{280}$ | Blind value of $OD_{280}$ | $OD_{280}$ corrected | Plasmin units per $OD_{280}$ corr. | Enrichment factor E |
|---|---|---|---|---|---|---|---|---|---|---|---|---|
| 625 | 3.13 | 625 | 3.13 | 11.0 | 1.37 | 15.07 | 67.9 | 9.13 | 1.25 | 7.88 | 0.174 | 1.57 |
| 1,000 | 5.00 | 625 | 3.13 | 7.0 | 1.55 | 10.85 | 48.9 | 9.72 | 1.43 | 8.29 | 0.187 | 1.68 |
| 1,375 | 6.88 | 625 | 3.13 | 5.5 | 1.74 | 9.57 | 43.1 | 10.3 | 1.69 | 8.61 | 0.202 | 1.82 |
| 625 | 3.13 | 1,000 | 5.00 | 12.0 | 1.42 | 17.04 | 76.8 | 9.50 | 1.79 | 7.71 | 0.184 | 1.66 |
| 1,000 | 5.00 | 1,000 | 5.00 | 7.5 | 1.57 | 11.78 | 53.1 | 9.88 | 2.21 | 7.67 | 0.205 | 1.85 |
| 1,375 | 6.88 | 1,000 | 5.00 | 5.0 | 1.73 | 8.65 | 39.0 | 9.72 | 2.65 | 7.07 | 0.245 | 2.21 |
| 625 | 3.13 | 1,375 | 6.88 | 13.0 | 1.36 | 17.68 | 79.6 | 9.64 | 2.76 | 6.88 | 0.198 | 1.78 |
| 1,000 | 5.00 | 1,375 | 6.88 | 9.0 | 1.47 | 13.23 | 59.6 | 9.50 | 2.97 | 6.53 | 0.225 | 2.03 |
| 1,375 | 6.88 | 1,375 | 6.88 | 9.0 | 1.52 | 13.68 | 61.6 | 9.00 | 3.34 | 5.66 | 0.269 | 2.42 |

100% activity~22.2 plasmin units. Specific activity of starting product: 0.111 plasmin units per $OD_{280}$.
Polyvinylpyrrolidon employed: Kollidon 17 from BASF (with 5.28% $H_2O$).

TABLE V pH=8.0; lysine concentration: 0.2 moles per liter; t~25° C.

| DEAE-Dextran, mg. per 20 ml. | DEAE-Dextran, percent | Methyl-cellulose, mg. per 20 ml. | Methyl-cellulose, percent | Volume of upper phase, ml. | Plasmin units per ml. | Plasmin units, total | Plasmin activity, percent | $OD_{280}$ | Blind value of $OD_{280}$ | $OD_{280}$ corrected | Plasmin units per $OD_{280}$ corr. | Enrichment factor E |
|---|---|---|---|---|---|---|---|---|---|---|---|---|
| 600 | 3.0 | 100 | 0.5 | 13.5 | 1.06 | 14.3 | 85.0 | 6.45 | 0.53 | 5.92 | 0.179 | 1.98 |
| 600 | 3.0 | 200 | 1.0 | 14.0 | 1.15 | 16.1 | 95.8 | 6.90 | 0.72 | 6.18 | 0.186 | 2.06 |
| 600 | 3.0 | 300 | 1.5 | 14.0 | 1.10 | 15.4 | 91.6 | 7.13 | 0.89 | 6.24 | 0.176 | 1.95 |
| 600 | 3.0 | 300 | 1.5 | 14.0 | 1.06 | 14.8 | 88.0 | 7.13 | 0.89 | 6.24 | 0.170 | 1.88 |
| 1,000 | 5.0 | 100 | 0.5 | 11.5 | 1.12 | 12.9 | 76.7 | 7.17 | 0.75 | 6.42 | 0.175 | 1.94 |
| 1,000 | 5.0 | 100 | 0.5 | 11.0 | 1.13 | 12.4 | 73.7 | 7.50 | 0.65 | 6.85 | 0.165 | 1.83 |
| 1,000 | 5.0 | 200 | 1.0 | 11.0 | 1.20 | 13.2 | 78.5 | 6.45 | 0.86 | 5.59 | 0.215 | 2.38 |
| 1,000 | 5.0 | 200 | 1.0 | 11.5 | 1.14 | 13.1 | 77.9 | 6.45 | 0.86 | 5.59 | 0.204 | 2.26 |
| 1,000 | 5.0 | 300 | 1.5 | 12.5 | 1.23 | 15.4 | 91.6 | 6.15 | 1.25 | 4.90 | 0.251 | 2.78 |
| 1,000 | 5.0 | 300 | 1.5 | 11.5 | 1.26 | 14.5 | 86.2 | 5.93 | 1.30 | 4.63 | 0.272 | 3.01 |

100% activity~16.8 plasmin units. Specific activity of starting product: 0.0904 plasmin units per $OD_{280}$.
Methylcellulose employed: Methocel MC USP 25 cps. from Fluka AG.

TABLE VI pH=8.0; t~25° C; 5% DEAE-Dextran; 5% PEG 6,000

| Amino acid | Concentration of amino acid, moles per liter | Volume of upper phase, ml. | Plasmin units per ml. | Plasmin units, total | Plasmin activity, percent | $OD_{280}$ | Blind value of $OD_{280}$ | $OD_{280}$ corrected | Plasmin units per $OD_{280}$ corrected | Enrichment factor E |
|---|---|---|---|---|---|---|---|---|---|---|
| γ-Aminobutyric acid | 0.1 | 9 | 1.488 | 13.51 | 42.8 | 2.00 | 0.525 | 1.475 | 1.01 | 9.10 |
| Ornithin-hydrochloride | 0.1 | 11 | 0.828 | 9.11 | 28.8 | 2.44 | 0.600 | 1.840 | 0.450 | 4.05 |
| ε-Aminocaproic acid | 0.1 | 10 | 1.038 | 10.38 | 32.8 | 1.62 | 0.450 | 1.170 | 0.887 | 7.99 |

100% activity~31.6 plasmin units. Specific activity of starting product: 0.111 plasmin units per $OD_{280}$.

Similarly experiments have also been carried out with arginine. In these experiments the arginine concentration was 0.2 mole per litre; besides, the experimental conditions were as reported in connection with Table VI. The results of these experiments appear from Table VII below.

The operativeness of the process of the invention in connection with the purification of bovine plasminogen appears from the experiments reported in Table VIII below. In these experiments the amino acid used was lysine in a concentration of 0.2 mole per litre. The crude bovine plasminogen was obtained from bovine serum, which was diluted 20 times its volume with water at pH 5.3 to form a precepitate which was separated and dissolved in water. The experiments were carried out at a pH of 8.0 and a temperature of 25° C.

Table IX below illustrates the results in connection with the purification of crude human plasminogen which was obtained from human serum in the same manner as the crude bovine plasminogen mentioned above.

Furthermore, experiments have been carried out to show that resin ion exchangers may be used in the process of the invention. The employed exchanger was Resine Amberlite IRA-400 (Cl) from Prolabo, Rhone-Poulenc, France. This Amberlite is a strong anion exchanger. The impure plasminogen was porcine plasminogen produced as described in connection with Table VII, and the amino acid was lysine used in a concentration of 0.2 mole per litre. The temperature during the experiments was 25° C. The results are compiled in Table X below.

The experiments show that optimal purification is obtained at pH 6.0 while with the use of the dextran ion

TABLE VII

| Volume of upper phase | Plasmin units per ml. | Plasmin units in total | Percent activity | $OD_{280}$ | Blind value of $OD_{280}$ | $OD_{280}$ corrected | Plasmin units per $OD_{280}$ corr. | Enrichment factor E |
|---|---|---|---|---|---|---|---|---|
| 11.0 | 1.64 | 18.0 | 30.0 | 4.90 | 2.88 | 2.02 | 0.111 | 2.70 |
| 11.5 | 1.40 | 16.1 | 26.7 | 4.50 | 2.88 | 1.62 | 0.864 | 2.88 |

100% activity~60.0 plasmin units. Specific activity of starting product: 0.300.

TABLE VIII

| DEAE-dextran, mg. per 20 ml. | DEAE-dextran, percent | PEG-6,000, mg. per 20 ml. | PEG-6,000, percent | Volume of upper phase, ml. | Plasmin units per ml. | Plasmin units in total | Percent activity | $OD_{280}$ | Blind value of $OD_{280}$ | $OD_{280}$ corr. | Plasmin units per $OD_{280}$ corr. | Enrichment factor E |
|---|---|---|---|---|---|---|---|---|---|---|---|---|
| 1,000 | 5.0 | 600 | 3.0 | 10 | 1.01 | 10.1 | 46.7 | 5.90 | 1.95 | 3.95 | 0.256 | 5.84 |
| 1,000 | 5.0 | 1,000 | 5.0 | 11.5 | 0.704 | 8.10 | 37.5 | 4.38 | 1.87 | 2.51 | 0.396 | 6.39 |
| 1,400 | 7.0 | 600 | 3.0 | 7.0 | 1.34 | 9.38 | 43.4 | 6.50 | 2.70 | 3.80 | 0.352 | 8.03 |
| 1,400 | 7.0 | 1,000 | 5.0 | 8.0 | 0.716 | 5.72 | 26.5 | 4.45 | 2.70 | 1.55 | 0.462 | 10.5 |

100% activity~21.6 plasmin units. Specific activity of starting product: 0.0438.

TABLE IX

| Lysine concentration in mole per litre | DEAE-dextran, mg. per 20 ml. | DEAE-dextran, mg. percent | PEG-6,000, mg. per 20 ml. | PEG-6,000, percent | Volume of upper phase, ml. | Plasmin units per ml. | Plasmin units in total | Percent activity | $OD_{280}$ | Blind value of $OD_{280}$ | $OD_{280}$ corr. | Plasmin units per $OD_{280}$ corr. | Enrichment factor E |
|---|---|---|---|---|---|---|---|---|---|---|---|---|---|
| 0.1 | 750 | 3.75 | 750 | 3.75 | 15 | 1.48 | 22.2 | 37.5 | 4.08 | 2.02 | 2.06 | 0.718 | 8.90 |
| 0.1 | 750 | 3.75 | 750 | 3.75 | 15 | 1.59 | 23.9 | 40.3 | 3.60 | 2.02 | 1.58 | 1.01 | 12.5 |
| 0.2 | 1,000 | 5.0 | 1,000 | 5.0 | 14 | 2.02 | 28.3 | 47.8 | 5.88 | 2.85 | 3.03 | 0.667 | 8.27 |
| 0.2 | 1,000 | 5.0 | 1,000 | 5.0 | 14 | 2.09 | 29.3 | 49.4 | 6.05 | 2.85 | 3.20 | 0.653 | 8.10 |
| 0.25 | 1,375 | 6.88 | 1,375 | 6.88 | 14 | 1.93 | 27.0 | 45.6 | 8.40 | 3.22 | 5.18 | 0.373 | 4.62 |
| 0.25 | 1,375 | 6.88 | 1,375 | 6.88 | 14 | 1.93 | 27.0 | 45.6 | 8.25 | 3.22 | 5.03 | 0.383 | 4.75 |

100% activity~59.2 plasmin units. Specific activity of starting product: 0.0807.

TABLE X

| pH | IRA-400, mg. per 20 ml. | IRA-400, percent | PEG 6,000, mg. per 20 ml. | PEG 6,000, percent | Vol. of upper phase, ml. | Plasmin units per ml. | Plasmin units in total | Percent activity | $OD_{280}$ | Blind val. of $OD_{280}$ | $OD_{280}$ corr. | Plasmin units per $OD_{280}$ corr. | Enrichment factor E |
|---|---|---|---|---|---|---|---|---|---|---|---|---|---|
| 8.0 | 500 | 2.5 | 1,000 | 5.0 | 19 | 4.35 | 82.7 | 52.0 | 7.40 | 0.196 | 7.20 | 0.604 | 1.94 |
| 8.0 | 1,000 | 5.0 | 1,000 | 5.0 | 19 | 4.80 | 91.2 | 55.0 | 6.10 | 0.180 | 5.92 | 0.811 | 2.61 |
| 8.0 | 2,000 | 10.0 | 1,000 | 5.0 | 19 | 5.01 | 95.2 | 57.4 | 6.20 | 0.174 | 6.03 | 0.831 | 2.67 |
| 8.0 | 3,000 | 15.0 | 1,000 | 5.0 | 18 | 4.95 | 89.1 | 53.7 | 6.20 | 0.196 | 6.00 | 0.825 | 2.65 |
| 8.0 | 2,000 | 10.0 | 0 | 0 | 18 | 9.26 | 166.7 | 100.5 | 22.0 | 0.186 | 21.8 | 0.425 | 1.28 |
| 8.0 | 2,000 | 10.0 | 0 | 0 | 17 | 9.11 | 154.9 | 93.4 | 17.5 | 0.182 | 17.3 | 0.527 | 1.69 |
| 8.0 | 2,000 | 10.0 | 250 | 1.25 | 18 | 9.00 | 162.0 | 97.7 | 16.5 | 0.192 | 16.3 | 0.552 | 1.67 |
| 8.0 | 2,000 | 10.0 | 250 | 1.25 | 18 | 8.86 | 161.3 | 97.3 | 13.0 | 0.192 | 12.8 | 0.700 | 2.25 |
| 8.0 | 2,000 | 10.0 | 500 | 2.50 | 18 | 8.73 | 157.1 | 94.7 | 13.1 | 0.226 | 12.9 | 0.678 | 2.05 |
| 8.0 | 2,000 | 10.0 | 500 | 2.50 | 18 | 7.74 | 139.3 | 84.0 | 10.0 | 0.226 | 9.77 | 0.792 | 2.55 |
| 8.0 | 2,000 | 10.0 | 750 | 3.75 | 18 | 6.24 | 112.3 | 67.7 | 10.0 | 0.240 | 9.76 | 0.639 | 1.93 |
| 8.0 | 2,000 | 10.0 | 750 | 3.75 | 18 | 6.19 | 111.4 | 67.1 | 7.75 | 0.240 | 7.51 | 0.824 | 2.65 |
| 4.0 | 2,000 | 10.0 | 1,000 | 5.0 | 19 | 6.60 | 125.4 | 75.6 | 5.40 | 0.180 | 5.22 | 1.264 | 3.82 |
| 4.0 | 2,000 | 10.0 | 1,000 | 5.0 | 19 | 7.35 | 139.7 | 84.3 | 5.40 | 0.182 | 5.22 | 1.408 | 4.25 |
| 6.0 | 2,000 | 10.0 | 1,000 | 5.0 | 19 | 4.71 | 89.5 | 54.0 | 2.72 | 0.191 | 2.53 | 1.861 | 5.62 |
| 6.0 | 2,000 | 10.0 | 1,000 | 5.0 | 19 | 4.32 | 82.1 | 49.5 | 2.50 | 0.187 | 2.31 | 1.87 | 5.65 |
| 10.0 | 2,000 | 10.0 | 1,000 | 5.0 | 19 | 8.55 | 162.5 | 98.0 | 10.0 | 0.210 | 9.79 | 0.873 | 2.64 |
| 10.0 | 2,000 | 10.0 | 1,000 | 5.0 | 19 | 8.70 | 165.3 | 99.7 | 10.25 | 0.220 | 10.03 | 0.867 | 2.62 |

100% activity~165.8 plasmin units. Specific activity of starting product: 0.311.

exchanger practically the same purification was obtained in the pH-range of 6 to 8. The experiments also show that the purification obtained depends on the polyethylene glycol concentration. At pH 8.0 the enrichment factor E increases from about 1.4 to about 2.7 when the PEG 6000 concentration increases from zero per cent to 3.75 percent.

Experiments have also been carried out with a cellulose ion exchanger, viz. DEAE-cellulose (Powder DE 50 from Whatmann in Great Britain). In these experiments use was made of the same crude porcine plasminogen as that used in the foregoing experiments. The amino acid was lysine used in a concentration of 0.2 mole per litre. The pH-value was 8.0 and the temperature 25° C. The results are compiled in Table XI below.

1 millilitre of the plasmin solution the activity of which is to be determined and the pH of which is 7.5 is added to two test tubes each containing in 0.4 molar phosphate buffer (pH 7.50) 1 millilitre of a 3 percent solution of Hammarsten Casein said solution having been preheated to 35.5° C. After standing for 2 minutes in thermostat at 35.5° C. there are added to one of the tubes 3 millilitres of a 1.7 molar solution of perchloric acid in distilled water, and after standing for 22 minutes at 35.5° C. there is added to the other tube the same quantity of perchloric acid solution. By the addition of the perchloric acid a precipitation takes place, and the two test tubes now stand for 20 minutes whereafter filtration two times through filtering paper (J. H. Munktells unrivalled Genuine Swedish Filtering Paper No. 0.9 cm.) is carried out. The extinction of the

TABLE XI

| DEAE-cellulose, mg. per 20 ml. | DEAE-cellulose, percent | PEG-6,000, mg. per 20 ml. | PEG-6,000, percent | Vol. of upper phase, ml. | Plasmin units per ml. | Plasmin units in total | Percent activity | $OD_{280}$ | Blind val. of $OD_{280}$ | $OD_{280}$ corr. | Plasmin units per $OD_{280}$ corr. | Enrichment factor E |
|---|---|---|---|---|---|---|---|---|---|---|---|---|
| 500 | 2.5 | 1,000 | 5.0 | 17 | 1.42 | 24.1 | 88.6 | 2.90 | 0.690 | 2.21 | 0.643 | 4.73 |
| 500 | 2.5 | 1,000 | 5.0 | 18 | 1.37 | 24.7 | 90.8 | 2.70 | 0.699 | 2.00 | 0.685 | 5.04 |
| 750 | 3.75 | 1,000 | 5.0 | 16 | 1.40 | 22.4 | 82.3 | 2.70 | 0.840 | 1.86 | 0.753 | 5.54 |
| 750 | 3.75 | 1,000 | 5.0 | 16 | 1.14 | 18.2 | 66.9 | 2.70 | 0.870 | 1.83 | 0.623 | 4.58 |
| 1,000 | 5.0 | 1,000 | 5.0 | 15 | 1.44 | 21.6 | 79.4 | 2.80 | 1.04 | 1.76 | 0.818 | 6.01 |
| 1,000 | 5.0 | 1,000 | 5.0 | 15 | 1.33 | 20.0 | 73.5 | 2.85 | 1.07 | 1.78 | 0.747 | 5.49 |

100% activity~27.2 plasmin units. Specific activity of starting product: 0.136.

In the foregoing experiments there has been employed a polymer having a molecular weight of 6000. However, it is possible to use polymers having a much lower molecular weight, for instance down to 400 and even lower. This may be illustrated by reference to the experiments compiled in Table XII below. In these experiments use was made of PEG 400 which is a liquid polyethylene glycol having a molecular weight of 400 and being obtainable from Shell. The plasminogen to be purified was crude porcine plasminogen obtained as mentioned above, the amino acid was lysine used in a concentration of 0.2 mole per litre, and the ion exchanger was DEAE-dextran used in a concentration of 5.0 percent. The pH-value was 8.0 and the temperature 25° C.

two solutions is thereafter measured at 275 m$\mu$ in a Beckman DU Spectrophotometer (1 cm. quartz cuvette), the value of the sample having stood for 2 minutes being used as blind value. The plasmin solution the activity of which is to be determined in diluted to such an extent that the extinction does not exceed 0.5 as at higher plasmin concentrations no proportionality exists between the extinction and the plasmin concentration.

I claim:

1. A process for the purification of human or animal plasminogen, comprising admixing the plasminogen with an aliphatic amino acid compatible with the plasminogen, an anion exchanger and a water-miscible polymer, whereby the plasminogen and the accompanying impurities are

TABLE XII

| PEG-400, ml. per 20 ml. in total | PEG-400, percent by vol. | Vol. of upper phase | Plasmin units per ml. | Plasmin units in total | Percent activity | $OD_{280}$ | Blind val. of $OD_{280}$ | $OD_{280}$ corr. | Plasmin units per $OD_{280}$ corrected | Enrichment factor E |
|---|---|---|---|---|---|---|---|---|---|---|
| 0 | 0 | 9 | 1.30 | 11.7 | 62.9 | 14.2 | 2.15 | 12.05 | 0.108 | 1.16 |
| 2 | 20 | 10 | 1.28 | 12.8 | 68.8 | 11.2 | 2.20 | 9.00 | 0.142 | 1.56 |
| 4 | 40 | 10 | 1.30 | 13.0 | 69.9 | 4.40 | 2.30 | 2.10 | 0.619 | 6.65 |
| 6 | 60 | 9 | 1.00 | 9.00 | 48.4 | 2.80 | 2.20 | 0.80 | 1.25 | 13.4 |
| 8 | 80 | 10 | 0.660 | 6.60 | 35.5 | 2.80 | 2.30 | 0.60 | 1.10 | 11.1 |
| 10 | 100 | 11 | 0.184 | 2.02 | 10.9 | 2.40 | 2.25 | 0.15 | 1.23 | 13.2 |

100% activity~18.6 plasmin units. Specific activity of starting product: 0.093.

As it will appear from the results a polymer having a relatively low molecular weight will have to be used in considerably higher concentrations than a polymer having a relatively high molecular weight, such as for instance PEG 6000. In order to obtain an E-value of about 6.0 it is necessary to use PEG 400 in an amount of about 40 percent by volume, while the same E-value may be obtained with PEG 6000 in a concentration of 4 to 5 percent by weight.

Throughout the present specification the plasmin activity has been expressed in plasmin units. One plasmin unit is defined as the amount of plasmin causing in 20 minutes the formation of decomposition products being soluble in perchloric acid and having an extinction of 1 unit at 275 m$\mu$ under the following experimental conditions:

distributed, respectively between two phases one of which is the anion exchanger and the other of which is the water-miscible polymer, and then isolating the water-miscible polymer phase.

2. A process according to claim 1, in which the aliphatic amino acid has a terminal amino group and a terminal carboxylic group in the main chain of the molecule.

3. A process according to claim 2, in which the aliphatic amino acid has 5 to 6 carbon atoms in the main chain of the molecule.

4. A process according to claim 2, in which the aliphatic amino acid is selected from the group consisting of lysine, $\gamma$-amino butyric acid, ornithine and $\epsilon$-amino caproic acid.

5. A process according to claim 4, in which the anion exchanger is of the dextran type.

6. A process according to claim 4, in which the anion exchanger is of the amberlite type.

7. A process according to claim 4, in which the anion exchanger is of the cellulose type.

8. A process according to claim 1, in which the water-miscible polymer is selected from the group consisting of polyethylene glycol, methyl cellulose and polyvinyl pyrrolidone.

References Cited

UNITED STATES PATENTS 3,066,079  11/1962  Hagan et al. _____ 195—66

A. LOUIS MONACELL, *Primary Examiner.*

L. M. SHAPIRO, *Examiner.*